United States Patent [19]
Hochstein

[11] Patent Number: 5,471,881
[45] Date of Patent: Dec. 5, 1995

[54] LENTICULAR GAUGE FACE

[76] Inventor: Kim W. Hochstein, 5247 Westmill Rd., Minnetonka, Minn. 55345

[21] Appl. No.: 228,406

[22] Filed: Apr. 15, 1994

[51] Int. Cl.$^6$ ............................ G03H 1/30; G02B 27/00; G01L 7/00
[52] U.S. Cl. ........................ 73/700; 359/22; 359/619
[58] Field of Search .................... 73/700, 866.1, 73/866.2, 866.3, 866.4, 714; 430/946; 350/3.75, 167

[56] References Cited

U.S. PATENT DOCUMENTS

| | | | |
|---|---|---|---|
| 2,538,843 | 1/1951 | McGuire | 73/866.3 |
| 3,873,210 | 3/1975 | Konopka | 356/138 |
| 3,915,007 | 10/1975 | Johanson et al. | 73/866.1 |
| 4,414,316 | 11/1983 | Conley | 430/496 |
| 4,420,527 | 12/1983 | Conley | 428/172 |
| 4,834,475 | 5/1989 | Robinson | 359/24 |
| 4,920,039 | 4/1990 | Fotland et al. | 430/324 |

FOREIGN PATENT DOCUMENTS 1186708  4/1970  United Kingdom .................. 73/866.3

*Primary Examiner*—Richard Chilcot
*Assistant Examiner*—William L. Oen
*Attorney, Agent, or Firm*—Faegre & Benson

[57] ABSTRACT

A refrigeration gauge face is modified by the use of two dimensional (2-D) lenticular animation display containing two different scale images. The two different scale images together provide separate temperature scales for each of the most commonly used of the older ozone depleting refrigerants and the newer non-depleting refrigerants. As the gauge is moved to either of two separate viewing angles, a different temperature scale image is visible at each angle. The images viewable at the two separate viewing angles provide additional space to accommodate scales for the most common older and newer refrigerants. A luminous background can be incorporated behind the temperature scale images for low light viewing.

23 Claims, 2 Drawing Sheets

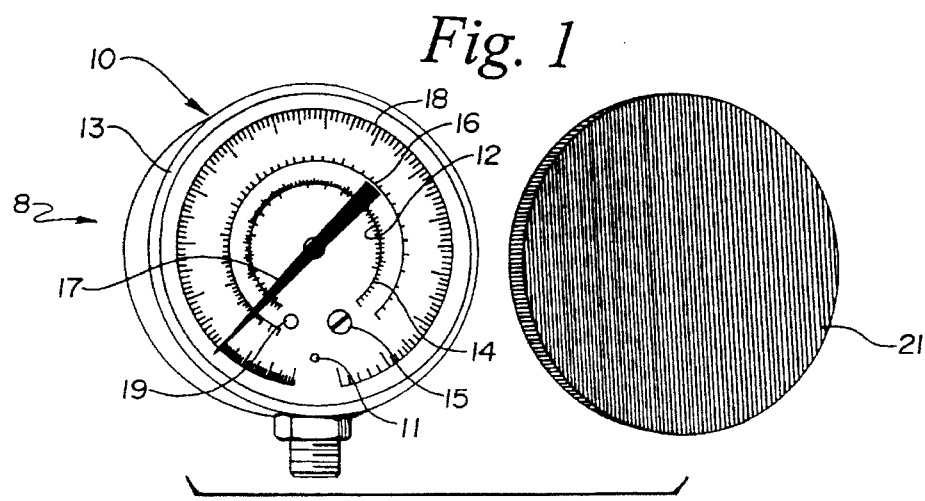
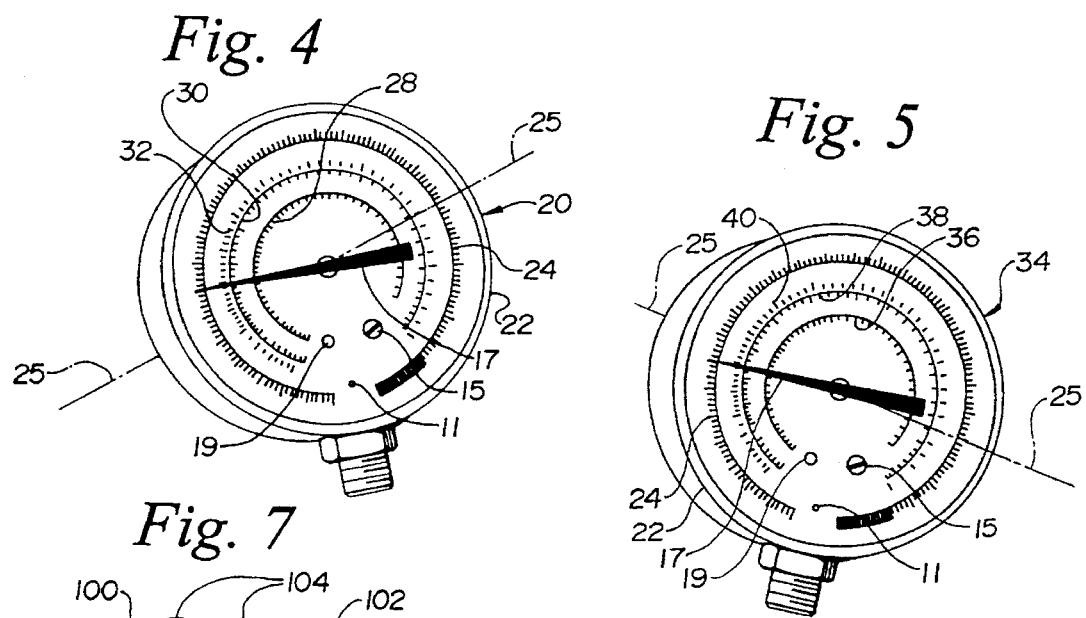
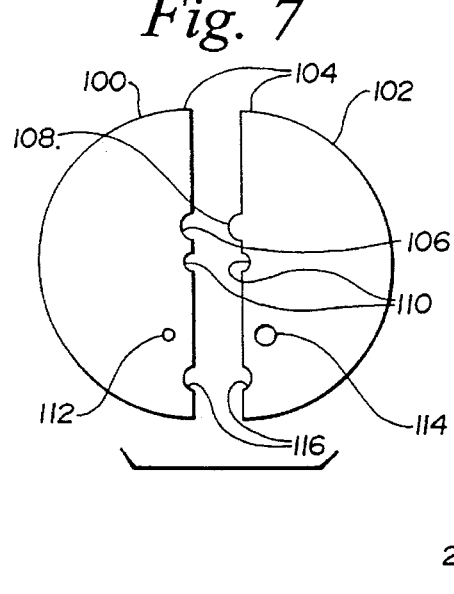
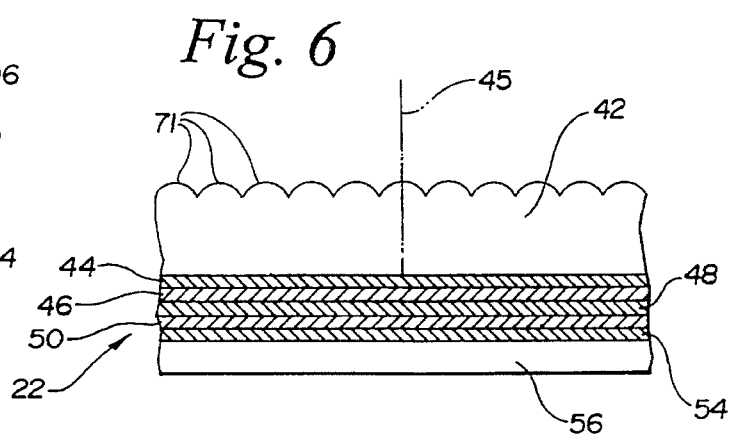

LENTICULAR GAUGE FACE

FIELD OF THE INVENTION

This invention relates in general to mechanical gauges and more particularly to mechanical pressure gauges used for determining the pressure of refrigerants in a refrigeration system. Specifically, this invention is a novel gauge face that for a new pressure gauge or a gauge face that can be retrofitted to an existing pressure gauge.

BACKGROUND OF THE INVENTION

In the refrigeration industry, a manifold pressure gauge set is commonly used for monitoring the pressure of refrigerants contained within a refrigeration system. A manifold pressure gauge set consists of two mechanical pressure gauges attached to a common manifold. Typically, one of the mechanical pressure gauges is a low pressure gauge and the other is a high pressure gauge. Each gauge has a scale calibrated in a particular pressure unit, such as pounds per square inch (psi).

On a typical prior art gauge, such as a low pressure gauge 8 illustrated in FIG. 1 (shown removed from the manifold), the outermost scale of a gauge face is a pressure reading scale 18, and, within the pressure reading scale 18, are three smaller diameter temperature scales 12, 14, 16 calibrated in temperature units, such as degrees Fahrenheit. The pressure is read from the gauge 8 by viewing the placement of the gauge needle 17 over the pressure reading scale 18.

The gauge 8 conventionally has a removable clear plastic cover 21 that unscrews from the front of the gauge 8. The cover 21 protects the gauge needle 17 and the pressure sensing gauge mechanism from damage and contamination. The cover 21 can be removed to provide access to a calibration screw 15 of the gauge 8 and to allow replacement of the cover 21 in case of damage to the cover 21.

The gauge face 10 illustrated in the prior art gauge 8 has the temperature scales 12, 14, 16 and the pressure scale 18 printed directly on it and the gauge face 10 is typically permanently riveted into a gauge housing 13. The gauge face 10 is usually made of thin steel but plastic or aluminum are sometimes used. Ordinarily, the gauge face 10 cannot be removed from the gauge housing 13 without damage, nor can the needle 17 ordinariliy be removed from the gauge 8 without damaging the pressure sensing mechanism (not shown) within the gauge 8.

The gauge 8 also conventionally has a needle stop pin 11 at the bottom of the gauge face 10 which provides protection for the gauge mechanism if the gauge 8 is subjected to pressures substantially beyond its maximum rating. In the event the gauge 8 is subjected to such a pressure, the needle stop pin 11 will stop the needle 17 from exceeding 360 degrees travel to prevent damage to the gauge 8. The gauge face 10 also ordinarily has an access hole through which a calibration screw 15 protrudes. This calibration screw 15 may adjusted from time to time to keep the gauge accurate by returning the needle 17 to "zero gauge" when the gauge is at idle. The manifold gauge set is considered at idle when its ports are open to atmospheric pressure, and not connected to a pressurized refrigerant containing system. In this idle condition, the gauge can be calibrated to indicate "zero gauge" on the gauge scale.

Each temperature scale 12, 14, 16 on the gauge face 10 is calibrated for a specific identifiable refrigerant used in a refrigeration system, with readings on the temperature scale corresponding to respective readings on the pressure scale 18. In the prior art manifold gauge face 10 shown in FIG. 1, scales 12, 14 and 16 are provided respectively for three common refrigerants, identified as R-22, R-12, and R-502. These three refrigerants are chlorofluorocarbons (or CFCs) and contain chlorine in their chemical make-up.

Chlorine has been determined to deplete the ozone layer around the earth when released into the atmosphere. CFCs are being phased out of use because, when they are released into the atmosphere, either by a leaking refrigeration system or through the process of venting a refrigeration system, they evaporate quickly. Because CFCs are lighter than air, they eventually migrate above the ozone layer surrounding the earth's atmosphere. The intense rays of the sun break down these CFCs and the constituent chlorine molecules are released. These free chlorine molecules then chemically combine with ozone molecules at a high ratio, gradually depleting the ozone layer and allowing more harmful UV light radiation to reach the earth.

Hydrofluorocarbon refrigerants (or HFCs) have been developed to eventually replace CFC compounds as refrigerants in refrigeration systems. Because HFCs do not contain chlorine, they are considered safe for the atmosphere. HFCs do not deplete ozone molecules as do the CFCs. Unfortunately, these new HFC refrigerants are primarily designed for use in newly manufactured equipment. It is inconvenient and labor-intensive to substitute HFCs in existing equipment as a replacement for CFC refrigerants, since HFCs are not compatible with the compressor oil used in most existing equipment designed for CFC refrigerants. In order to introduce the newer ozone safe HFC refrigerants into most existing equipment as a replacement for a CFC refrigerant, the existing compressor oil must be flushed out of the system. This can be very difficult and time consuming. Also, in some older equipment, HFC refrigerant can cause some rubber seals to degenerate.

To replace CFC refrigerants in existing equipment, interim retrofit refrigerants have been developed utilizing hydrocholorofluorocarbons (or HCFCs). HCFC refrigerants have a much lower ozone depletion factor than CFCs, which means that, while they still contain chlorine, their use is much less detrimental to the ozone layer. HCFCs are expected to be permitted in an extended interim period, with eventual phase out in the year 2010. Thus, it is often recommended and easier to replace the older CFC refrigerant with an interim HCFC refrigerant.

Each refrigerant available has its own operating characteristics that make it useful and efficient for a specific application. Some of the more commonly used refrigerants are listed as follows, giving their chemical composition (i.e., CFC, HCFC, HFC) and specific applications for which they are suitable.

R-22 is a CFC refrigerant which is most commonly used in high temperature applications where the evaporator is above freezing (32 degrees), such as building and room air conditioning systems. The ozone depletion factor of R-22 is relatively small, so it is not scheduled to be phased out until the year 2020.

R-12 is another CFC refrigerant. R-12 is most commonly used in medium temperature applications where the evaporator is at or below freezing, such as refrigerators, coolers, and automotive air conditioning. The ozone depletion factor of R-12 is relatively large and as a result it is scheduled to be out of production by the end of 1995. The two main replacements which have been developed for R-12 are R-134a and R-401A. R-134a is an HFC with no ozone depleting factor and will be used in the manufacture of new equipment. It is difficult to use R-134a in existing equipment as a substitute for R-12 for the reasons discussed above with regard to substituting HFCs for CFCs. R-134a is not compatible with the compressor oil used in systems originally designed for R-12. R-401A is available as a interim replacement refrigerant for existing systems that are designed to use R-12. It is an HCFC and has a small ozone depletion factor and will be eventually phased out as the life of existing R-12 equipment expires.

R-502 is the third common CFC refrigerant. R-502 has a high ozone depletion factor and will be phased out of production at the end of 1995. Its main use is for low temperature refrigeration where evaporator temperatures are set at or below 0 degrees Fahrenheit, such as storage freezers, ice makers, and grocery store systems. The two main replacements for R-502 are R-404A and R-402A. R-404A is an HFC with no ozone depletion factor and will be available in new manufactured equipment. Like R-134a, it is difficult to use R-404A in R-502 systems as a retrofit for the reasons discussed above with regard to substituting HFCs for CFCs. R-404A is not compatible with the compressor oil used in R-502 systems. R-402A is an HCFC and has a small ozone depletion factor. R-402A is designed as an interim retrofit refrigerant for systems currently operating on R-502.

There is a direct, experimentally determined, relationship between pressure and temperature for each refrigerant. For example, the refrigerant identified as R-22, at a pressure of 30 psi, has a temperature of 7° Fahrenheit. However, each of these older and newer refrigerants has a different pressure/temperature relationship. When a refrigerant system is monitored with a manifold gauge, the gauge face must have one pressure scale and several separate temperature scales. Each temperature scale is identified with and calibrated for a specific refrigerant. The temperature of a specific refrigerant can then be easily and quickly determined at whatever pressure the refrigeration system is at.

The pressure/temperature scales on these gauges also give important information about the operating conditions of the refrigerant within a refrigeration system. The low pressure gauge on the manifold pressure gauge set is used to monitor the suction or evaporator side of the refrigeration circuit. Low pressure scale typically reads from 30" Hg vacuum to 350 psi. The vacuum portion of the scale is necessary because the compressor in a system can pull a vacuum on the low pressure side of the system under certain operating conditions The low pressure scale of the manifold set is used during the installation and maintenance of a refrigeration system to set pressure controls for on/off cycling, to adjust metering devices in the system, check proper operation and refrigerant charge, and to determine the pressure/temperature of the evaporator. The pressure/temperature scales provide useful information for all of these situations. All refrigerants have a direct pressure/temperature relationship whether the refrigerant is in a liquid or gaseous state.

A high pressure gauge of the manifold gauge set is used to monitor the high pressure side (known as the condensing side) of the refrigeration system. The high pressure scale typically reads from 0 psi. to 500 psi. The high pressure scale is mainly used to monitor condensing pressure/temperatures for setting safety controls, fan cycling controls, check proper refrigerant charge, and to determine proper pumping capacity of the compressor.

For example, the appropriate temperature scale, read in comparison to the pressure scale on a low pressure gauge, is used to set the compressor of a medium temperature range refrigerator (36 to 40 degrees F.) to turn on and off at proper refrigerant pressures to prevent the contents of the refrigerator from freezing or from becoming too warm. The compressor must turn on when the refrigerator temperature reaches an upper set temperature (e.g., 40 degrees F.). The refrigerator temperature can be monitored using the pressure/temperature scale on a manifold gauge connected to the system. As the pressure of the system rises, the indicated reading on the gauge can be used to convert pressure to temperature directly on the gauge and arrive at a desired operational pressure setting to turn on the compressor and maintain the temperature from rising above the desired maximum temperature.

After the compressor system has been operating for a while, the temperature inside the refrigerator starts to fall. As the temperature falls, the indicator reading on the pressure/temperature scale can be used to convert temperature to pressure to determine a desired operational pressure setting to turn off the compressor and prevent the temperature from falling below the desired minimum temperature.

The temperature scale on the high pressure gauge, read in comparison to the pressure scale, is used to adjust proper condensing temperature, usually at 115 degrees Fahrenheit. Because of the wide range of pressures in a refrigeration system, and the need to monitor both high and low pressure sides of the system simultaneously, both high and low pressure gauges are often needed on one manifold.

With the introduction of new refrigerants and the concurrent use of the CFC refrigerants, reference scales for the new refrigerants are needed on these manifold gauge faces. Providing temperature scales on the manifold pressure gauge face for both older CFC refrigerants and newer HFC and HCFC refrigerants will make the existing manifold pressure gauge extremely useful when converting a refrigerant system from a CFC refrigerant to a HFC or HCFC refrigerant. A comparison of temperature and pressure relationship for both an older and a newer refrigerant can be made visually on the gauge face to compare the operating characteristics of a refrigerant system that is operating with a newer refrigerant as opposed to the same system operating with the older refrigerant.

Unfortunately, because of the physical size and limited space on the gauge face, there is insufficient room to include both older and newer temperature scales. One alternative is to determine the pressure reading of the refrigerant using a prior art manifold gauge, and then convert this pressure reading to the temperature for the new refrigerant by using appropriate pressure/temperature conversion charts for that refrigerant. This method is time consuming and inconvenient. Also, in converting a refrigeration system from one refrigerant to another, this method makes it difficult to compare operating pressures/temperatures for two different refrigerants.

These pressure/temperature charts provide conversion of saturated vapor pressure to temperature. With the introduction of HCFCs (interim refrigerants), the saturated vapor pressure figures are only useful under certain conditions because of a factor called temperature glide. Temperature glide is a factor existing in many of the new interim refrigerants, such as refrigerants R-401A, R-402A. R-401A and R-402A are each composed of a blend of chemicals that have different temperature characteristics, depending on whether they are in a gaseous or a liquid state, or are changing from one state to the other. For a pressure/temperature chart to be most useful, the chart must contain pressure/temperature conversions for the refrigerant both as a saturated gas and as a saturated liquid. To use the chart, the temperature of the refrigerant must be calculated when the refrigerant is changing from the gas state to the liquid state.

For example, when a refrigeration system is operating, the refrigerant in the evaporator (the cooling coil) enters as a liquid and evaporates to a gas while passing through the length of the evaporator, absorbing heat during the process of evaporating. To determine the temperature of the evaporator by using a manifold pressure gauge together with a pressure/temperature chart, it is first necessary to determine the pressure of the system using the gauge. Then reference is made to the pressure/temperature chart for that pressure. Since the refrigerant is changing state in the evaporator, the temperatures for both the saturated vapor and the saturated liquid are taken from the pressure/temperature chart. The average between these two temperatures must then be calculated to determine the average evaporator temperature in the refrigeration system. Using these pressure/temperature charts often requires estimating to within 1–9 degrees Fahrenheit (depending upon the specific refrigerant and its temperature glide factor) to arrive at the average temperature relationship in the refrigeration system being monitored.

Another alternative for determining the pressure/temperature relationship for a refrigerant would be to use two different manifold pressure gauge sets, one with old refrigerant scales and one with new. However, this alternative would prove costly and would still make accurate pressure/temperature comparisons of older and newer refrigerants difficult.

OBJECTS OF THE INVENTION

An object of this invention is to incorporate all necessary reference scales for the most commonly used older and newer refrigerants on a single standard manifold gauge face.

Another object of the present invention is to improve the overall usefulness of current manifold gauge sets in use.

A further object of this invention is to provide the gauge face with scales calibrated reflect average temperatures within a system to eliminate the need for further calculations.

Also, it is an object of this invention to provide a luminous dial to aid in reading the gauge face in low light conditions.

SUMMARY OF THE INVENTION

These and other objects of the present invention are achieved in a standard refrigeration gauge face by the use of a two dimensional (2-D) lenticular animation, or display, in which a lenticular film is laminated over a modified gauge face image containing two different temperature scale images. The two different temperature scale images together provide sufficient room for separate temperature scales for each of the most commonly used of the older (CFC) refrigerants and the newer HFC and HCFC refrigerants. As the gauge is tipped (or the observer moves) to either of two separate viewing angles, a different temperature scale image appears at each angle. The lenticular image can be enhanced by incorporating a luminous background to allow for low light viewing.

This new lenticular display gauge face can be used as a retrofit in a standard refrigeration gauge by incorporating an adherent (e.g., magnetic or adhesive) backing and inserting the lenticular display gauge face in the gauge housing over the existing gauge face. Alternatively, this new gauge face can be used in the manufacture of new gauges as the standard face incorporated into the gauge housing.

BRIEF DESCRIPTION OF THE DRAWINGS

FIG. 1 shows a prior art low pressure gauge and its scales, with a plastic cover removed from the gauge housing.

FIG. 4 shows a low pressure mechanical gauge with a 2-D lenticular animation gauge face of this invention, as seen at a first viewing angle with a first set of temperature scales visible at the first viewing angle.

FIG. 5 shows a low pressure mechanical gauge with a 2-D lenticular animation gauge face of this invention, as seen at a second viewing angle with a second set of temperature scales visible at the second viewing angle.

FIG. 6 shows a side elevation view of the lenticular gauge face and its composite layers.

FIG. 7 shows the die cut shape for the retrofit gauge face.

DETAILED DESCRIPTION OF THE INVENTION

As explained above, FIG. 1 shows a standard prior low pressure gauge face 10 with three refrigerant temperature scales 12, 14, 16 for each of three common CFC refrigerants, R-22, R-12, and R-502, respectively. The gauge face 10 is generally screen printed directly onto a steel face that is fastened into the housing. Clear plastic cover 21 is shown removed from the gauge 8.

A 2-D lenticular animation allows viewing each of two distinctly different images, by viewing the display at each of two separate viewing angles. This is accomplished by the use of a lenticular film, which is a clear plastic composite sheet that has many small lenses (or "micro lenticules") formed on its surface. The concentration of micro lenticules on the film may range from about 50 lenticules per inch (lpi.) to about 400 lpi., with sheet thicknesses ranging from about 7 mil to about 30 mil. A detailed description of a particular lenticular film, together with a detailed description of its method of manufacture and method of operation, is provided in U.S. Pat. Nos. 4,414,316 and 4,420,527, which are incorporated herein by reference.

Figure 2:
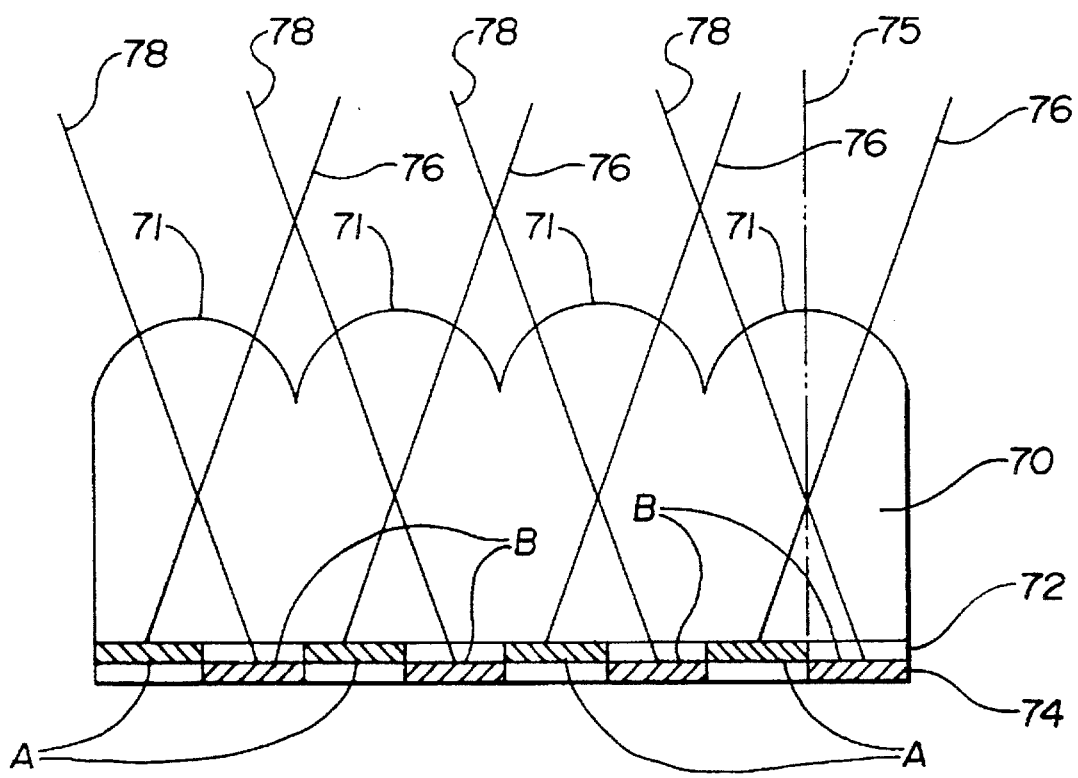
FIG. 2 is a schematic illustration of the construction of a 2-D lenticular display, for viewing two different images at either of two different viewing angles.

Referring to FIG. 2, a simplified view of a lenticular film 70 is illustrated capable of showing either an image A, embodied on first image layer 72, or an image B, embodied on second image layer 74. Although shown in two separate layers 72, 74, it is possible to place stagger or interdigitate image A and image B onto a single layer. Image A, embodied on first image layer 72, is viewed by looking through the micro lenticules 71 of the lenticular film 70 at a first viewing angle 76. Image A on image layer 72 is divided by gaps and staggered, so that when a viewer looks through the micro lenticules 71 of the lenticular film 70 at the desired first viewing angle 76, only the image on image layer 72 is visible. Image B, embodied on second image layer 74, is viewed by looking through the micro lenticules 71 of the lenticular film 70 at a second viewing angle 78. Image B on image layer 74 is similarly divided by gaps and staggered, so that when a viewer looks through the micro lenticules 71 of the lenticular film 70 at the desired second viewing angle 78, only the image on film layer 42 is visible.

The two viewing angles of the 2-D lenticular film used in the gauge face of the present invention are each approximately 30 degrees off perpendicular 75, or about 30 degrees from each other. This provides the best transition between the two gauge face images. A wide range of other types of lenticular film are commercially available with different lens angles and different viewing angles from the perpendicular, all of which may be used for viewing multiple images on a single display.

Figure 3:
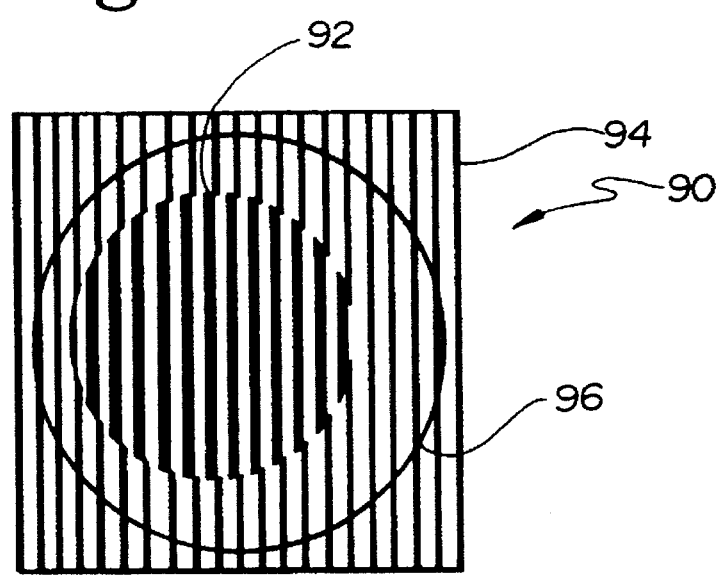
FIG. 3 is a plan view of an image designed for viewing through a lenticular film.

FIG. 3 shows a magnified lenticular display image 90 with the lenticular film removed. The display image 90 consists of a dot 92 as one image, a square 94 as another image, and a circle 96 around the dot 92 as a third image. The dot 92 and square 94 images are 10 staggered to not fall on top of each other, but the circle 96 around the dot 92 is solid and has no separations in its line. When a lenticular film is placed over this display 90 in a precise manner as to line up the lenticules on the lenticular film with the staggers found in the dot 92 and the square 94, the micro lenticules in the film direct the eyes to either the dot 92 or the square 94, but not both, depending on the viewing angle. The circle 96 around the dot 92 would be visible at all viewing angles, because it is a continuous line visible through the micro lenticules at all angles.

Thus, it is possible to construct a lenticular display where one image is viewable from a first angle, but not from a second angle, while a second image is viewable from a second angle but not from the first angle, while a third part of the display is viewable from any angle. These principles are used to construct the lenticular gauge face of the present invention in which one set of scales is viewable from only one angle, another set of scales is viewable only from a second angle, and a third set of scales is viewable from all angles.

FIG. 4 shows a first view of the lenticular gauge face 22 of the present invention. The gauge face 22 is viewed from an angle of approximately 30 degrees to a line 25 perpendicular to the plane of the lenticular gauge face 22. The outer pressure scale 24 reads in pounds per square inch (psi). This pressure scale 24 is used to determine the pressure of a refrigerant as an indicator needle 17 responds to the pressure of the refrigerant in the manifold. The three temperature scales 28, 30, 32 read in degrees Fahrenheit in direct relation to the position of the needle 17 and the outermost pressure scale 24. Each temperature scale 28, 30, 32 is labeled to reflect a different refrigerant, e.g., MP-39 (a DuPont trademark for their R-401A refrigerant), R-134a, and R-12, respectively, and the temperature of that refrigerant relative to a corresponding pressure.

FIG. 5 shows the same lenticular gauge face 22, viewed from an angle of approximately 30 degrees to the line 25 perpendicular to the plane of the lenticular gauge face 22, opposed to the angle of viewing of the first lenticular image 20, to expose the second lenticular image 34 of the lenticular gauge face 22. The same outer pressure scale 24 is visible in viewing each of the lenticular images 20, 34. The three temperature scales 36, 38, 40 now visible are different than the three temperature scales 28, 30, 32 visible in the first lenticular image 20. Each temperature scale 36, 38, 40 of the second lenticular image 34 is labeled for its respective refrigerant type, e.g., R-502, R-22, R-404A.

FIG. 6 shows a side elevational view of a preferred embodiment of the lenticular gauge face 22 of this invention. The gauge face 22 has a clear plastic composite lenticular film 42 as a top layer. The lenticular film 42 is formed with a plurality of micro lenticules 71 (or small lenses) per inch, each having two different opposing viewing angles, with each viewing angle offset approximately 30 degrees from a line 45 perpendicular to the plane of the display. The lenticular film used in this preferred embodiment has 135 micro lenticules per inch and is 12 mil thick. Lenticular film of this type is commonly commercially available, for example a film identified as QUAD/PACER 135 lpi., available from Quad Tech International, Sussex, Wis., a division of Quad Graphics Inc.

Below this film layer 42 are several layers of photopolymer film (a film on which an image is developed by exposure under intense UV light). Each layer contains a different image. Some of the photopolymer film layers have images which are intended to be visible only at a single specific angle of view through the lenticular film layer 42, while other photopolymer film layers have images which are intended to be visible at all viewing angles through the lenticular film layer 42.

Each photopolymer film layer is developed using different color toners according to the following description. A first photopolymer film layer 44 with the outermost pressure scale 24, intended to be visible at all viewing angles, is developed in black toner. On a second photopolymer film layer 46, the image is intended to be visible as the first lenticular image 20, and the temperature scales 28, 30, 32 are developed in green toner. On a third photopolymer film layer 48, intended to be visible as the second lenticular image 34, the temperature scales 36, 38, 40 are developed in blue toner. On a fourth photopolymer film layer 50, also intended to be visible at all viewing angles, a portion of the outermost pressure scale 24 (reading from 0 psi to 30 in Hg vacuum), is developed in red toner.

This composite lamination of individual photopolymer film layers 44, 46, 48, 50 may then be laminated over a vinyl phosphorus (to glow in the dark after exposure to light) background 54 by using an optically clear adhesive to allow the background 54 to illuminate through the adhesive and photopolymer film layers 44, 46, 48, 50 and through the clear lenticular film 42. The final lamination may be to a thin flexible magnetic backing layer 56, so the finished gauge face 22 can be adhered to an existing steel face plate of the gauge.

A separate process for creating a lenticular animation is to print the images directly on the back side of the lenticular film with a specialized printing press. This processes is particularly useful for creating a large volume of lenticular animations.

FIG. 7 shows the shape of the two halves 100, 102 of a retrofit embodiment of a lenticular gauge face 104 capable of being installed into a prior art gauge as a replacement face. Most pressure gauges used in the refrigeration industry are of a common construction, with a diameter of approximately 2 and ½ inches and a common placement of the needle 17, the needle stop 11, the calibration screw 15 and the rivet 19. The replacement gauge face 104 of the combination of halves 100, 102 is circular with an approximate diameter of 2 ⅜ inches for insertion into a prior art gauge housing. Bifurcation the face 104 into two halves 100, 102 allows insertion of the face 104 under the indicator needle 17. A notch 106 and a mating protrusion 108 serve to properly align the halves 100, 102 after insertion. Additional clearances in the face 104 exist for compatibility with the prior art gauge. Reliefs 110 provide clearance for the stem of needle 17. Hole or recess 112 allows for clearance of the rivet 19 to allow the lenticular dial face 104 to adhere flat to the existing face plate. Hole 114 provides access to the calibration screw 15, and finally reliefs 116 allow the needle stop pin 11 to extend through the face 104.

Installation of the face 104 is accomplished by removing the clear removable cover 21 (shown in FIG. 1) of the prior art gauge 8 and turning the calibration screw 15 on the gauge 8 so the needle 17 is resting on stop pin 11 at bottom of the gauge 8. The individual halves 100, 102 of retrofit lenticular dial face 104 are then inserted one half at a time. The notch 106 and the protrusion 108 are used to align the two halves 100, 102. The gauge 8 is then re-calibrated to zero using the calibration screw 15 and the clear cover 21 is reinstalled on gauge 8.

A lenticular image gauge face of the present invention can also be incorporated in the original manufacture of new pressure gauges by simply eliminating the magnetic backing 56 and laminating the lenticular dial face directly onto the face plate of the gauge. The face plate can then be riveted into the gauge housing as the gauge is constructed, as is done in the prior art.

In use, the manifold pressure gauge 8 can be attached to the pressure ports of a refrigeration system and the gauge set can be tipped (to and away from viewer) until the desired scale 20, 34 is seen. The gauge readings will be accurate due to the fact that all common pressure gauge manifolds are manufactured to the same set of measurements and standards.

The invention is not to be taken as limited to all of the details thereof as modifications and variations thereof may be made without departing from the spirit or scope of the invention. For instance, the staggered or interdigitated images could be positioned in such a way that, at some viewing angles, both images could be viewed simultaneously, although this is not the preferred embodiment. In addition, while the invention has been described and has particular use in connection with pressure gauges used in the refrigeration industry, the present lenticular gauge face invention could be used in any mechanical gauge utilizing an indicator which moves mechanically in response to the current status of a changeable external condition such as pressure gauges used in other industries.

What is claimed is:

1. An improved mechanical refrigeration gauge of the type having an indicator with a position responsive to pressure of a refrigerant in a refrigeration system and a pressure scale for showing the pressure of the refrigerant in the refrigeration system based on the position of the indicator, the improvement comprising:

a) a first staggered image having a first temperature scale for a first refrigerant wherein the position of the indicator in relation to the first temperature scale indicates a particular temperature for the first refrigerant when the first refrigerant is at the pressure indicated by the indicator on the pressure scale;

b) a second staggered image having a second temperature scale for a second refrigerant wherein the position of the indicator in relation to the second temperature scale indicates a particular temperature for the second refrigerant when the second refrigerant is at the pressure indicated by the indicator on the pressure scale, such that the second staggered image is positioned in an interdigitated manner with respect to the first staggered image;

c) a lenticular means layered with respect to the first and second staggered images for displaying only the first staggered image through the lenticular means when the gauge is viewed from a first viewing angle, and for displaying only the second staggered image through the lenticular means when the gauge is viewed from a second viewing angle.

2. The gauge of claim 1, wherein the first and second viewing angles comprise all possible viewing angles.

3. The gauge of claim 1 wherein the first staggered image comprises at least one additional temperature scale for an additional refrigerant, wherein the position of the indicator in relation to the additional temperature scale indicates a particular temperature for the additional refrigerant when the additional refrigerant is at the pressure indicated by the indicator on the continuous pressure scale.

4. The gauge of claim 3, wherein the first temperature scale is the temperature scale for the refrigerant R-12, the additional temperature scale is the temperature scale for the refrigerant R-134a and wherein the first staggered image further comprises a temperature scale for the refrigerant R-401A.

5. The gauge of claim 3, wherein the second staggered image comprises a second additional temperature scale for a second additional refrigerant, wherein the position of the indicator in relation to the second additional temperature scale indicates a particular temperature for the second additional refrigerant when the additional refrigerant is at the pressure indicated by the indicator on the pressure scale.

6. The gauge of claim 5, wherein the first staggered image comprises temperature scales for the refrigerants R-401A, R-134a and R-12, and the second staggered image comprises temperature scales for the refrigerants R-502, R-22 and R-404A.

7. The gauge of claim 1, wherein the indicator is a needle.

8. The gauge of claim 7, wherein the gauge is circular, and the temperature scales extend circumferentially around the gauge.

9. The gauge of claim 1, further including a third image viewable through the lenticular means from only a third viewing angle.

10. The gauge of claim 1, further including a third image viewable through the lenticular means from all viewing angles.

11. The gauge of claim 10, wherein the third image is the pressure scale.

12. A mechanical gauge for indicating the current status of a changeable condition external to the gauge comprising:

a) a gauge housing;

b) a condition-responsive communication means for communicating the condition to the gauge housing;

c) an indicator movable with respect to the gauge housing, the indicator responsive to the changeable condition communicated by the communication means;

d) a scale attached to the gauge housing for reading the current condition in relation to location of the indicator, the scale having:

i) a first staggered scale image;

ii) a second staggered scale image, arranged in an interleaved relationship with respect to the first staggered scale image;

iii) a lenticular film arranged with respect to the first and second staggered scale images for displaying only the first staggered scale image when the scale is viewed through the lenticular film from a first viewing direction, and for viewing only the second staggered scale image when the scale is viewed through the lenticular film from a second viewing direction.

13. The gauge of claim 12, wherein the indicator is a needle.

14. The gauge of claim 13, wherein the gauge is circular, and the first and second staggered scale images extend around the circumference of the gauge.

15. The gauge of claim 12 wherein the angle between the first viewing direction and an adjacent second viewing direction is about 60 degrees.

16. A gauge face for replacing an existing face of a circular mechanical gauge, the gauge having a centrally mounted needle mounted on a needle stem, the gauge face comprising;
   a) a first semi-circle half having a front surface with a first portion of the gauge face, a back surface having attachment means for attaching the first semi-circle half to the existing face, and a generally flat edge; and
   b) a second semi-circle half having a front surface with a second portion of the gauge face, a back surface having attachment means for attaching the second semi-circle half to the existing face, and a generally flat edge;
wherein the first semi-circle half and the second semi-circle half are insertable over the existing face on either side of the needle stem to cover the existing face, such that the first portion of the gauge face and the second portion of the gauge face together form a gauge face different than the existing face.

17. The gauge face of claim 16, wherein the gauge face further comprises:
   a) a first staggered scale image on the front surfaces of the first and second semi-circle halves;
   b) a second staggered scale image also on the front surfaces of the first and second semi-circle half, arranged in an interleaved relationship with respect to the first staggered scale image;
   c) a lenticular film located on top of the first and second staggered scale images, arranged with respect to the first and second staggered scale images for displaying only the first staggered scale image when the gauge face is viewed through the lenticular film from a first viewing angle, and for displaying only the second staggered scale image when the gauge face is viewed through the lenticular film from a second viewing angle.

18. The gauge face of claim 17 wherein each of the first and second semi-circle halves further comprise a relief positioned to allow a needle stop pin on the gauge to extend through the gauge face.

19. The gauge face of claim 18 wherein a portion of both the first and second semi-circle halves form a hole to allow the needle stem to extend through the gauge face.

20. The gauge face of claim 19 wherein one of the first and second semi-circle halves further comprises a portion forming a hole located over a calibration screw on the existing gauge face to allow access to the calibration screw through the gauge face.

21. The gauge of claim 1, wherein the pressure scale is continuous.

22. The gauge face of claims 17 or 18 wherein the generally flat edge of the first semi-circle half further comprises a protrusion, and the generally flat edge of the second semi-circle half further comprises a notch shaped and positioned to accept and mate with the protrusion.

23. A scale face for use in connection with a mechanical indicator which moves with respect to the scale face to indicate the value of an external condition or value, the scale face comprising:
   a) a first staggered scale image;
   b) a second staggered scale image interdigitated with the first staggered scale image; and
   c) a clear sheet having numerous micro lenticules positioned over the first and second staggered scale images such that when the gauge face is viewed from a first viewing angle, the first staggered scale image is primarily seen, and when the gauge face is viewed from a second viewing angle, the second staggered scale image is primarily seen.

\* \* \* \* \*